(12) United States Patent
Douzono et al.

(10) Patent No.: US 10,345,862 B1
(45) Date of Patent: Jul. 9, 2019

(54) SUPPORT AND ELECTRONIC DEVICE (71) Applicant: LENOVO (SINGAPORE) PTE. LTD., Singapore (SG)

(72) Inventors: Satoshi Douzono, Yokohama (JP); Takehito Yamauchi, Yokohama (JP); Shinichi Kubota, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/040,482

(22) Filed: Jul. 19, 2018

(30) Foreign Application Priority Data

Apr. 26, 2018 (JP) .................................. 2018-085076

(51) Int. Cl.
G06F 1/16 (2006.01)
(52) U.S. Cl.
CPC .................................. G06F 1/1656 (2013.01)
(58) Field of Classification Search
CPC ...................................................... G06F 1/1656
See application file for complete search history.

(56) References Cited

U.S. PATENT DOCUMENTS

| | | | | |
|---|---|---|---|---|
| 6,097,592 A * | 8/2000 | Seo | ....................... | G06F 1/1616 248/351 |
| 7,679,905 B2 * | 3/2010 | Wu | ....................... | G06F 1/1613 248/372.1 |
| 7,697,283 B2 * | 4/2010 | Mathew | ................. | A47B 91/00 248/188 |
| 7,817,418 B2 * | 10/2010 | Bailey | .................. | H05K 5/0234 361/679.59 |
| 7,898,802 B2 * | 3/2011 | Lian | ....................... | G06F 1/1616 108/50.01 |
| 8,199,498 B2 * | 6/2012 | Wang | ....................... | G06F 1/181 248/638 |
| 8,213,177 B2 * | 7/2012 | Uttermann | ........... | H05K 5/0234 248/188.8 |
| 8,264,839 B2 * | 9/2012 | Shen | ..................... | H05K 5/0204 248/188.8 |
| 8,531,836 B2 * | 9/2013 | Iwamoto | .............. | H05K 5/0234 248/677 |
| 8,531,837 B2 * | 9/2013 | Lee | ......................... | G06F 1/166 174/138 E |

(Continued)

FOREIGN PATENT DOCUMENTS

JP          2003167644 A          6/2003

*Primary Examiner* — Lisa Lea-Edmonds
(74) *Attorney, Agent, or Firm* — Shimokaji IP (57) ABSTRACT

A support for an electronic device is able to prevent a chassis from wobbling without coming off from the chassis. The support is attached to an opening of the chassis of the electronic device. The support includes a base portion positioned on an exterior surface side of the chassis so as to overlap the opening, a retaining portion that is positioned on an inner surface side of the chassis and provided so that the opening is able to retain the retaining portion with or without interposing a separate member, a connecting portion that connects the base portion and the retaining portion with each other and is inserted through the opening, and an elastic protruding portion provided on the base portion and structures a contact point with the exterior surface of the chassis. The base portion is structured so as to support the chassis through the elastic protruding portion.

14 Claims, 7 Drawing Sheets

(56) References Cited

U.S. PATENT DOCUMENTS

| | | | | |
|---|---|---|---|---|
| 8,929,067 B2* | 1/2015 | Wu | ............... | G06F 1/1626 |
| | | | | 361/679.45 |
| 8,941,990 B2* | 1/2015 | Uttermann | ............ | H05K 5/0234 |
| | | | | 248/188.8 |
| 8,985,545 B2* | 3/2015 | Chiu | ............... | H05K 5/0234 |
| | | | | 248/188.8 |
| 2002/0043608 A1* | 4/2002 | Nakata | ............... | F16F 1/025 |
| | | | | 248/560 |
| 2013/0250511 A1* | 9/2013 | Farrow | ............... | B32B 7/04 |
| | | | | 361/679.59 |
| 2015/0146373 A1* | 5/2015 | Deng | ............... | G06F 1/166 |
| | | | | 361/679.59 |

* cited by examiner

SUPPORT AND ELECTRONIC DEVICE

FIELD OF THE INVENTION

The present invention relates to a support and an electronic device.

BACKGROUND OF THE INVENTION

Conventionally, on a bottom surface of a chassis of an electronic device such as a laptop PC, rubber legs are provided in order to absorb an impact on the chassis or to prevent the chassis from slipping (for example, see Patent Document 1).

[Patent Document 1]

Japanese Patent Application Laid-Open No. 2003-167644

SUMMARY OF THE INVENTION

Commonly, supports like those rubber legs are attached to four corners of a bottom surface of a chassis of an electronic device by using double sided tape, respectively, and all of the supports come into contact with a mounting surface when the chassis is mounted on a desktop. However, when the manufactured chassis has distortion, some of the supports do not come into contact with the mounting surface, which could make the chassis wobbly.

Meanwhile, as a conventional support, a rubber leg is also known that is deformed by a load applied by a chassis so as to absorb a gap between the support that is not in contact with a mounting surface, and the mounting surface. However, when the rubber leg receives a load repeatedly, double sided tape that sticks the rubber leg is peeled off, and the rubber leg could thus come off from the chassis.

Therefore, an object of the present invention is to provide a support that is able to prevent a chassis from wobbling without coming off from the chassis, and an electronic device.

A support according to an aspect of the present invention is a support attached to an opening of a chassis of an electronic device. The support includes a base portion positioned on a side of an exterior surface of the chassis so as to overlap the opening, a retaining portion that is positioned on a side of an inner surface of the chassis and provided so that the opening is able to retain the retaining portion with or without interposing a separate member, a connecting portion that connects the base portion and the retaining portion with each other and is inserted through the opening, and an elastic protruding portion that is provided on the base portion and provides a contact point with the exterior surface of the chassis. The base portion is structured so as to be able to support the chassis through the elastic protruding portion.

According to this aspect, when the chassis, in which the support is attached to the opening, is mounted on, for example, a desktop, the base portion of the support comes into contact with a mounting surface of the desk, and supports the chassis through the elastic protruding portion. Then, the elastic protruding portion that is in contact with the exterior surface of the chassis is compressed by a load from the chassis and the electronic device. Thus, a height position of the chassis with respect to the mounting surface is lowered. Therefore, even when a plurality of the supports is used to support the chassis that is distorted, a gap between the support that is not in contact with the mounting surface, and the mounting surface is absorbed, thereby preventing the chassis from wobbling.

In addition, in the support, the base portion on the side of the exterior surface of the chassis is connected with the retaining portion on the side of the inner surface of the chassis through the connecting portion. Also, the opening, through which the connecting portion is inserted, is able to retain the retaining portion. Thus, it is possible to prevent the support from coming off from the opening of the chassis. Further, it is also possible to attach the support to the opening of the chassis without using double sided tape.

The above-described aspects of the present invention can provide a support and an electronic device, the support being able to prevent a chassis from wobbling without coming off from the chassis.

BRIEF DESCRIPTION OF THE DRAWINGS

FIG. 4 shows sectional views of the support according to the first embodiment of the present invention, in which

FIG. 6 shows sectional views of an electronic device according to a second embodiment of the present invention, in which

DETAILED DESCRIPTION OF THE INVENTION

Embodiments of the present invention are explained with reference to the attached drawings. In each of the drawings, constituents having the same reference numeral have the same or similar structure.

First Embodiment

A support according to the present invention is applicable to various electronic devices including a note-sized personal computer (hereinafter, referred to as a "laptop PC"), a tablet-sized personal computer, a keyboard, and a projector. In this specification, an example is explained in which a support according to an embodiment of the present invention is applied to a laptop PC.

Figure 1:
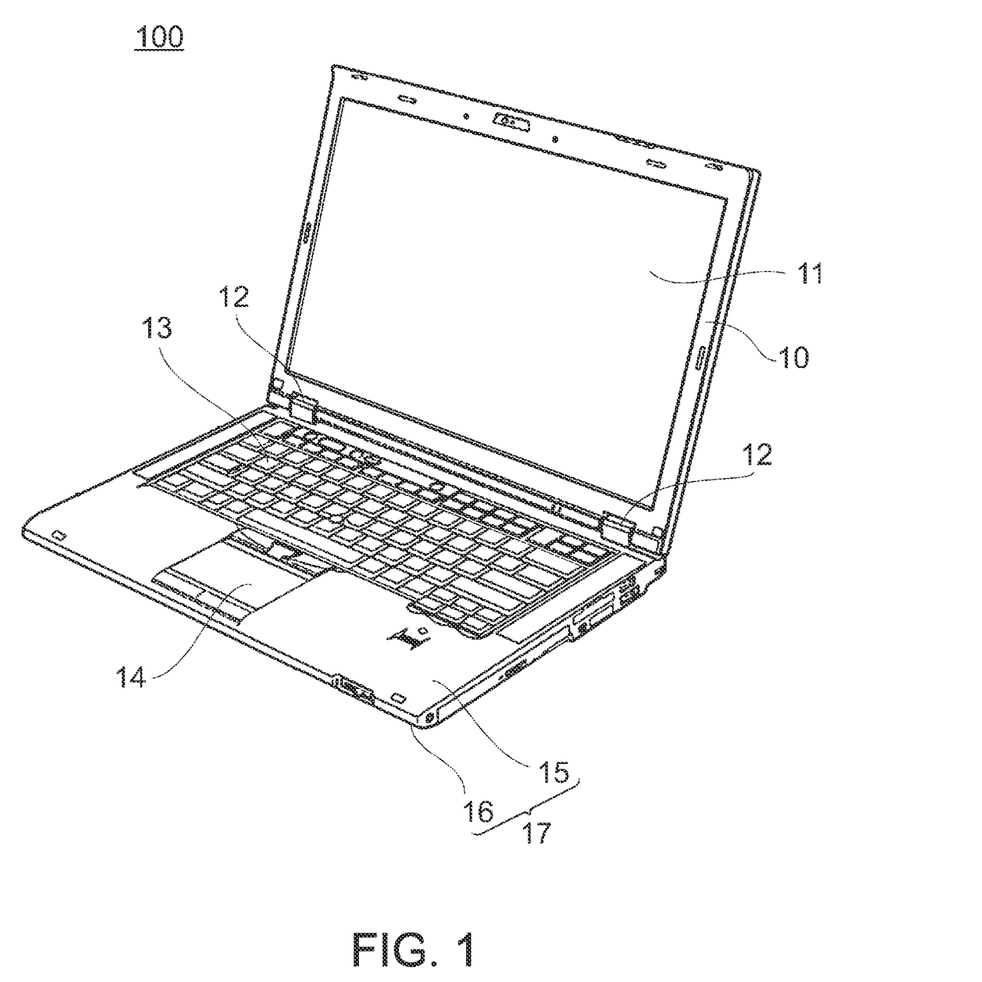
FIG. 1 is a perspective view of an electronic device according to a first embodiment of the present invention.

FIG. 1 is a perspective view of a laptop PC 100 according to a first embodiment of the present invention. The laptop PC 100 includes a lid body 10, a chassis 17, and hinge parts 12. Each of the hinge parts 12 is attached to long sides of the lid body 10 and the chassis 17, and connects the lid body 10 and the chassis 17 with each other in a rotatable manner. This means that the lid body 10 is able to open and close with respect to the chassis 17. FIG. 1 shows a state where the lid body 10 is open with respect to the chassis 17.

The lid body 10 includes a display 11. The display 11 is provided at a position where the display 11 faces the chassis 17 when the lid body 10 is closed. Letters, images, and so on are shown on the display 11. The display 11 may be, for example, a liquid crystal display, or an organic electroluminescence display. A display control circuit and so on that control a display on the display 11 are accommodated, for example, inside the lid body 10.

The chassis 17 includes an upper surface cover 15 and a bottom surface cover 16. As the upper surface cover 15 and the bottom surface cover 16 are superimposed on each other in a vertical direction and their peripheries are joined to each other, the chassis 17 is assembled. A substrate, a CPU, a memory, an HDD or an SDD, a battery, and so on, which are not illustrated, are accommodated inside the chassis 17. The chassis 17 is provided with a keyboard 13 so that key tops project from the upper surface cover 15 side. Further, a touch pad 14 is provided adjacent to the keyboard 13. A user is able to operate the laptop PC 100 through input units such as the keyboard 13, the touch pad 14, and so on.

Figure 2:
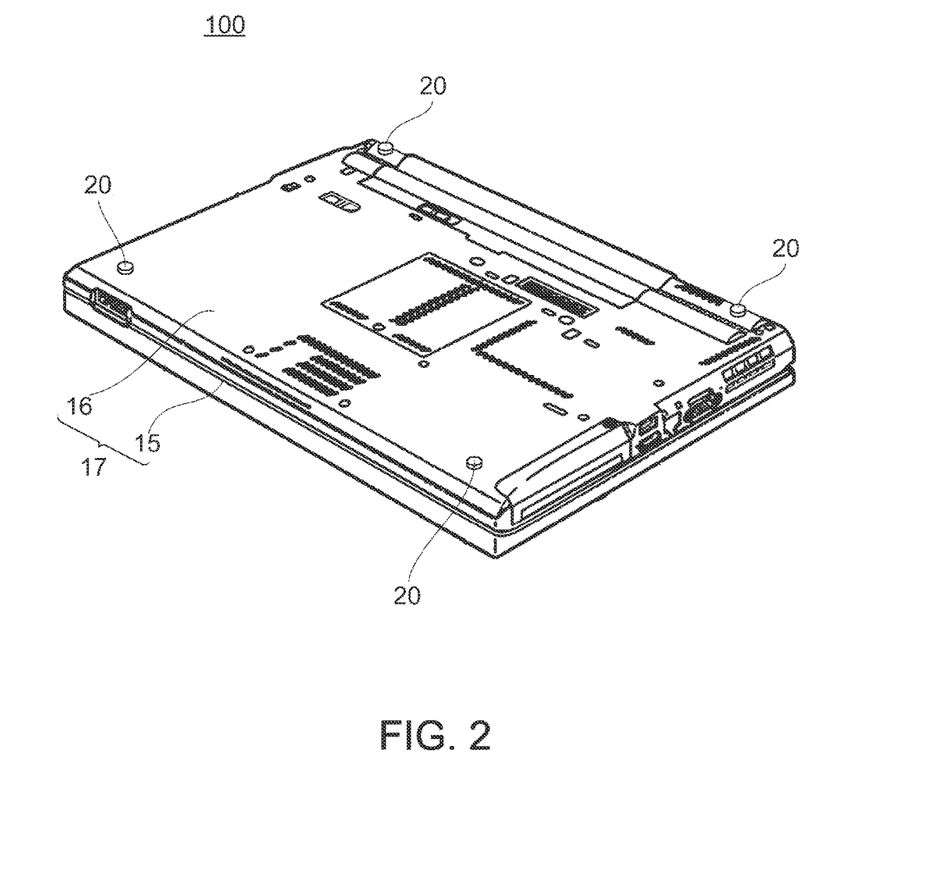
FIG. 2 is a bottom view of the electronic device according to the first embodiment of the present invention.

FIG. 2 is a bottom view of the laptop PC 100. FIG. 2 shows a state where the lid body 10 is closed with respect to the chassis 17. The bottom surface cover 16 of the chassis 17 includes supports 20. In this embodiment, there are the four supports 20 in total that are provided in corner portions of the bottom surface cover 16, respectively. However, attaching places, the number, and so on of the supports 20 are arbitrary, are not limited to the example shown in FIG. 2, and may be changed in accordance with a weight, a type, and so on of the electronic device.

When the chassis 17 is mounted, the supports 20 are positioned between a mounting surface and the chassis 17 and support the chassis 17. The supports 20 are made from, for example, an elastic material, and have a function of absorbing an impact on the chassis and preventing the chassis from slipping when the chassis 17 is mounted.

Figure 3:
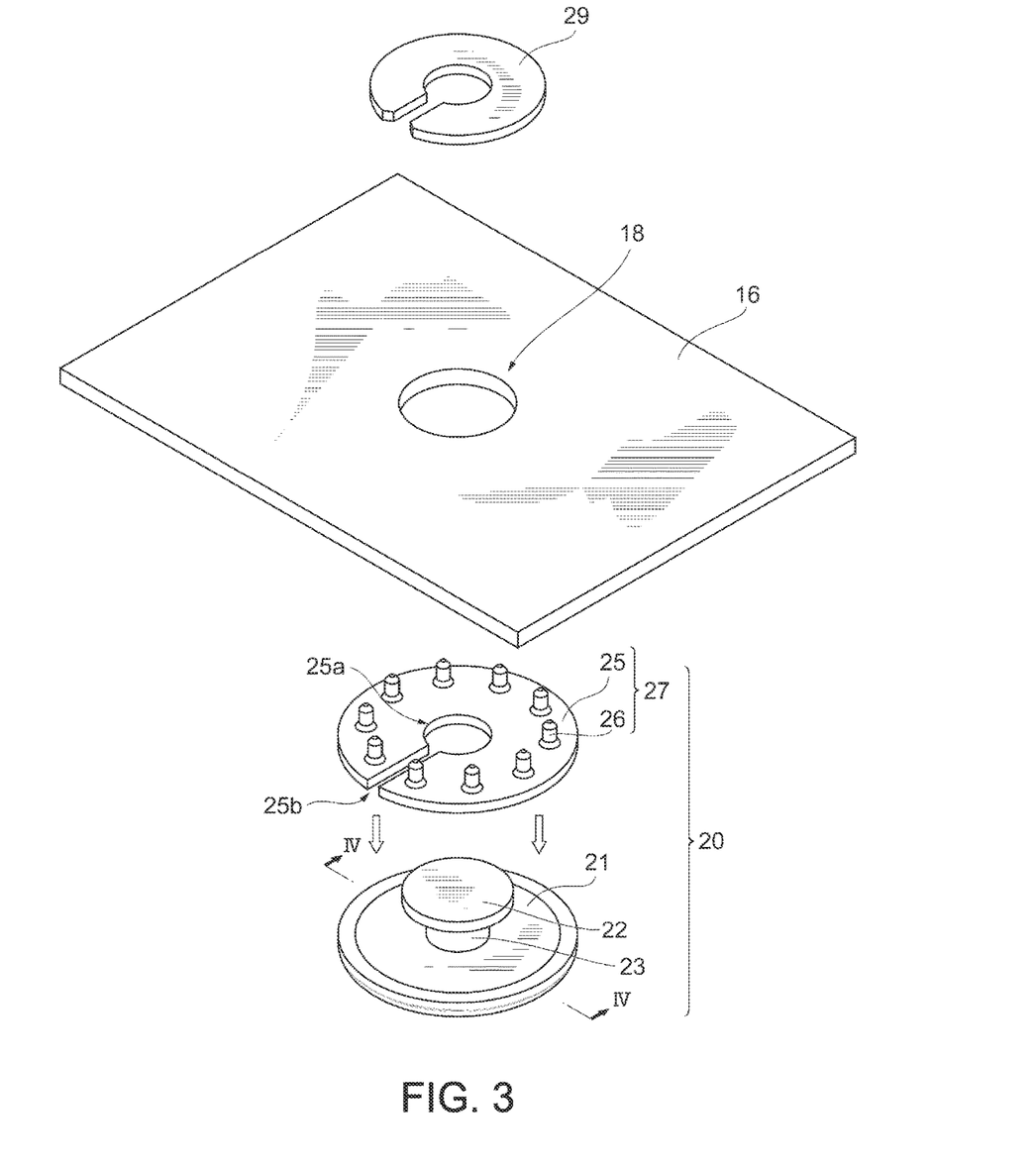
FIG. 3 is an exploded perspective view of a support and peripheral parts according to the first embodiment of the present invention.
Figure 4A:
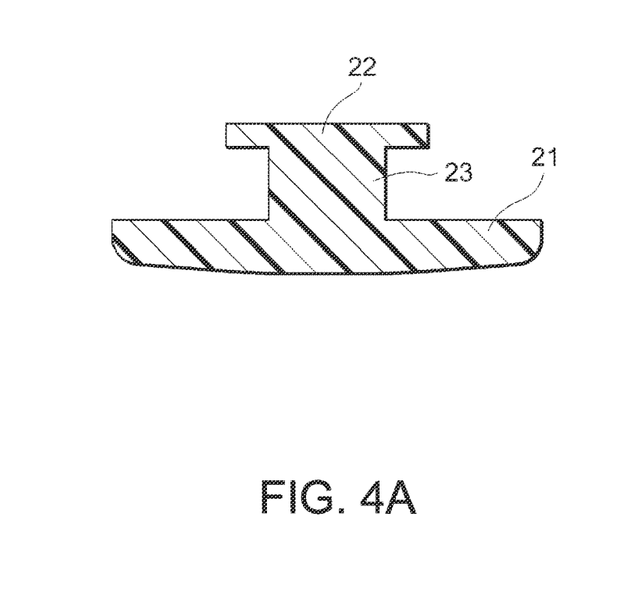
FIG. 4A is a sectional view of the support without an elastic member, the sectional view being taken along the line IV-IV in FIG. 3.
Figure 4B:
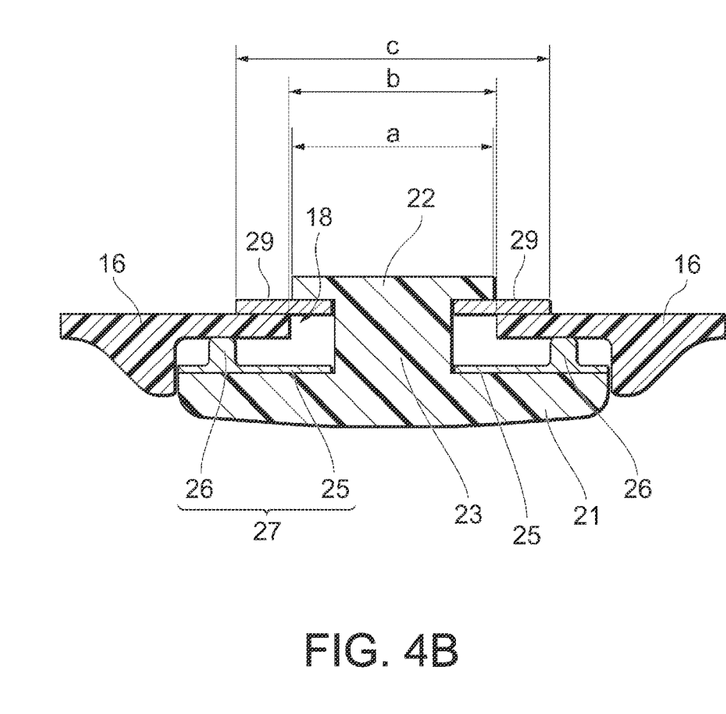
FIG. 4B is a sectional view of the part shown in FIG. 4A with the peripheral parts attached.
Figure 5:
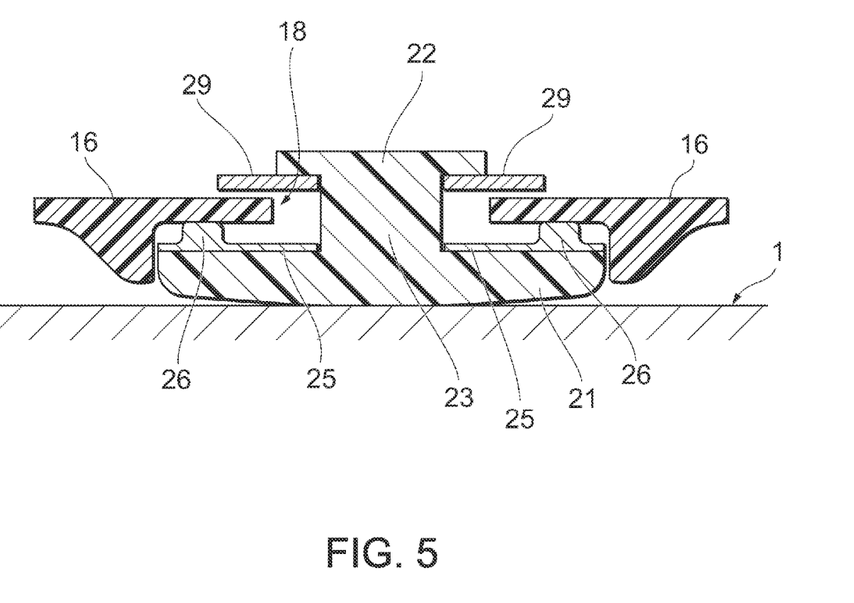
FIG. 5 is a sectional view of the support shown in FIG. 4B when the chassis is mounted.

Next, a mode of attaching the supports 20 to the chassis 17 and functions of the supports 20 are explained with reference to FIG. 3 through FIG. 5. FIG. 3 is an exploded perspective view of the support 20 and peripheral parts. FIG. 3 shows a vicinity of the corner portion of the bottom surface cover 16 of the chassis 17, where the support 20 is attached. FIG. 4 shows sectional views of the support 20. FIG. 4A is a sectional view of the support 20 without an elastic member 27, the sectional view being taken along the line IV-IV in FIG. 3. FIG. 4B is a sectional view of the part shown in FIG. 4A with peripheral parts attached. FIG. 5 is a sectional view of the support 20 shown in FIG. 4B when the chassis 17 is mounted on a desktop or the like.

As shown in FIG. 3, the support 20 includes a base portion 21, a retaining portion 22, a connecting portion 23, and the elastic member 27. A circular opening 18 is formed in the bottom surface cover 16 of the chassis 17, and the retaining portion 22 and the connecting portion 23 of the support 20 can be inserted through the opening 18 towards an inside of the chassis 17. A shape of the opening 18 is not limited to a circle shape, and may be a rectangular shape, an elliptic shape, and so on.

The base portion 21 is a portion that comes into contact with the mounting surface when the chassis 17 is mounted. As shown in FIG. 4A, the base portion 21 is formed into a flange shape on one end side (a first end side) of the connecting portion 23. A surface that comes into contact with the mounting surface is formed into a gentle arc shape with a vertex located in the center of the surface, and a surface that is joined to the connecting portion 23 is formed into a flat shape. Although the base portion 21 is formed into a flat shape in a side view, a thickness of the base portion 21 is arbitrary and is not limited. Further, although the base portion 21 according to this embodiment is formed into an almost columnar shape, the shape is also arbitrary, and arbitrary shape such as a triangle prism and a quadrangular prism may be used. As shown in FIG. 4B, the base portion 21 is positioned so as to overlap the opening 18 on a side of an exterior surface of the bottom surface cover 16. As the base portion 21 is formed into the flange shape, it is possible to ensure a large space on the base portion 21 where elastic protruding portions 26 are provided.

As shown in FIG. 4B, the retaining portion 22 is positioned on a side of an inner surface of the chassis 17 and is provided so that the opening 18 is able to retain the retaining portion 22 with or without interposing a separate member such as a ring portion 29. In this embodiment, the retaining portion 22 is provided so as to be retained through the ring portion 29. The retaining portion 22 is formed into a flange shape in a second end portion of the connecting portion 23, the second end portion being on the opposite side of the base portion 21 from a first end portion in which the base portion 21 is provided. A diameter "a" of the retaining portion 22 is formed so as to be smaller than a diameter "b" of the opening 18. Therefore, the retaining portion 22 easily goes through the opening 18 and is inserted to an inner side of the bottom surface cover 16.

After the retaining portion 22 is inserted into the chassis 17, the ring portion 29 is disposed between the retaining portion 22 and an inner surface of the bottom surface cover 16. As shown in FIG. 3, a slit is formed in the ring portion 29, the slit connecting a central opening and an outer periphery with each other. After the ring portion 29 is deformed so as to expand the slit and the connecting portion 23 is positioned in the central opening of the ring portion 29, a shape of the ring portion 29 is restored to an original shape, thus disposing the ring portion 29 so as to surround the connecting portion 23. As shown in FIG. 4B, an outer diameter "c" of the ring portion is larger than the diameter "b" of the opening 18. Therefore, by disposing the ring portion 29, the retaining portion 22 does not come off from the chassis 17, thus preventing falling of the support 20.

The diameter "a" of the retaining portion 22 may be formed so as to be larger than the diameter "b" of the opening 18. In that case, the retaining portion 22 can be retained by itself without using the ring portion 29. When the diameter "a" of the retaining portion 22 is formed so as to be larger than the diameter "b" of the opening 18, the retaining portion 22 may be made from, for example, an elastic material that is able to deform elastically, so that the retaining portion 22 is inserted through the opening 18.

The connecting portion 23 connects the base portion and the retaining portion 22 with each other and is inserted through the opening 18. As the connecting portion 23 is provided, a gap is made between the base portion 21 and the retaining portion 22. In the gap, the elastic member 27, the bottom surface cover 16, and the ring portion 29 are disposed. Although the connecting portion 23 is formed into a columnar shape and extends in a perpendicular direction from the base portion 21, the shape of the connecting portion is not limited as long as the connecting portion 23 connects the base portion 21 and the retaining portion 22 with each other. For example, the connecting portion 23 may be a curved shape, a helical shape, or the like. The number of the connecting portions 23 is also not limited, and two connecting portions 23 or more may be formed.

The base portion 21, the retaining portion 22, and the connecting portion 23 may be formed integrally. When the base portion 21, the retaining portion 22, and the connecting portion 23 are formed integrally, they can be treated as a single part, and part management is thus done easily. Further, as the base portion 21, the retaining portion 22, and the connecting portion 23 are formed integrally by pouring heated resin or the like into a single mold, it is not necessary to prepare a plurality of molds for the base portion 21, the retaining portion 22, and the connecting portion 23, respectively, thereby reducing manufacturing cost of the support 20. The base portion 21, the retaining portion 22, and the connecting portion 23 may be an integrally-formed rubber leg. With the use of rubber, it is possible to absorb an impact on the chassis 17 and prevent the chassis 17 from slipping when the chassis 17 is mounted.

As shown in FIG. 3, the elastic member 27 includes a main body 25 and the elastic protruding portions 26, and is disposed between the base portion 21 and an exterior surface of the bottom surface cover 16. In a central part of the main body 25, a fitting opening 25a is provided, into which the connecting portion 23 can be fitted, and the main body 25 is thus formed into a ring shape in a top view. Also, a slit 25b is formed in the main body 25, the slit 25b connecting the fitting opening 25a and a circumference of the main body 25 with each other. After the slit 25b of the main body 25 is expanded so as to deform the main body 25 elastically, and the connecting portion 23 is positioned in the fitting opening 25a, the main body 25 is then restored to an original shape. Thus the main body 25 can be fitted to the connecting portion 23 easily. Since the connecting portion 23 and the main body 25 are fitted to each other, it is possible to prevent the elastic member 27 from falling from the connecting portion 23.

As shown in FIG. 4B, the elastic protruding portions 26 are provided on the base portion 21, and provide contact points with the exterior surface of the bottom surface cover 16. The elastic protruding portions 26 are made of elastic members that are made from, for example, resin. When the chassis 17 to which the supports 20 are attached is mounted on, for example, a desktop, the base portion 21 of each of the supports 20 comes into contact with the mounting surface 1 of the desk, and also supports the bottom surface cover 16 (the chassis 17) through the elastic protruding portions 26 as shown in FIG. 5. At this point, a load from the chassis and the electronic device compresses the elastic protruding portions 26 that are in contact with the exterior surface of the bottom surface cover 16. Thus, a height position of the chassis 17 with respect to the mounting surface 1 is lowered. When the electronic device, in which the plurality of supports 20 is attached to the distorted chassis 17, is mounted, some of the supports 20 may not come into contact with the mounting surface 1, thus making the chassis 17 wobbly. By using the supports 20 according to this embodiment, the height position of the chassis 17 with respect to the mounting surface 1 is lowered, thus absorbing gaps between the supports 20 that are not in contact with the mounting surface 1, and the mounting surface 1. Accordingly, all of the supports 20 are brought into contact with the mounting surface 1. Therefore, it is possible to prevent the chassis 17 from wobbling.

In addition, in each of the supports 20 according to this embodiment, the base portion 21 on the side of the exterior surface of the chassis 17 is connected with the retaining portion 22 on the side of the inner surface of the chassis 17 through the connecting portion 23, and the retaining portion 22 can be retained with respect to the opening 18 through which the connecting portion 23 is inserted. Thus, it is possible to prevent the support 20 from coming off from the opening 18 of the chassis 17. In other words, without using double sided tape and so on, it is possible to attach the support 20 to the opening 18 of the chassis 17.

Further, as shown in FIG. 3, the plurality of elastic protruding portions 26 is disposed in an almost circle shape, and a central part of the circle defined by the elastic protruding portions 26 coincides with a central part of the opening 18. Therefore, in whichever direction the exterior surface of the chassis 17 is inclined due to distortion of the chassis 17, any of the plurality of elastic protruding portions 26 comes into contact with the exterior surface of the chassis 17 and is compressed. Therefore, the supports are able to follow inclination in any direction and support the chassis 17. A curve defined by the elastic protruding portions 26 does not need to be a complete circle shape, and slight distortion is acceptable. Also, the elastic protruding portions 26 may be disposed in a double circle shape or a spiral shape in a top view.

The disposed positions and the number of the elastic protruding portions 26 are not limited to the example shown in FIG. 3. For example, the elastic protruding portions 26 may be disposed into a polygonal shape such as a triangular shape and a quadrangular shape. Further, the elastic protruding portions 26 may be scattered irregularly by embossing the main body 25.

Moreover, as shown in FIG. 4B, the elastic member 27 is made of a member that is separated from the base portion 21. Therefore, both the base portion 21 and the elastic protruding portions 26, respectively, are readily provided individual characteristics expected from a design perspective. For example, by making the elastic protruding portions 26 from an elastic material, elasticity of the elastic protruding portions 26 is ensured, and, at the same time, by making the base portion 21 from a hard material, strength of the support 20 can be improved.

In this embodiment, the elastic member 27 is disposed so that the main body 25 comes into contact with the base portion 21, and the elastic protruding portions 26 come into contact with the bottom surface cover 16. Instead, the elastic member 27 may be turned upside down so that the elastic protruding portions 26 come into contact with the base portion 21, and the main body 25 comes into contact with the bottom surface cover 16.

Second Embodiment

Figure 6A:
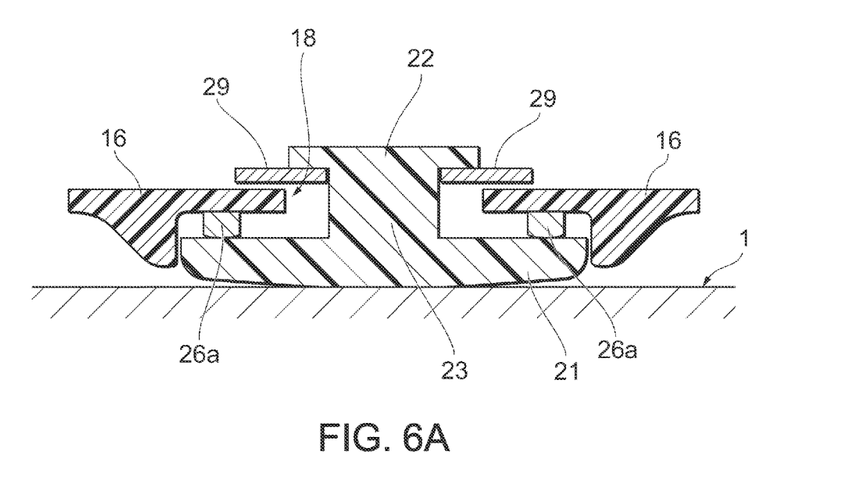
FIG. 6A is a sectional view in a case where protruding portions formed on a bottom surface cover are made from an elastic material.

FIG. 6A shows a sectional view of an electronic device according to a second embodiment of the present invention. The electronic device according to the second embodiment is different from the electronic device according to the first embodiment in that elastic protruding portions 26a are formed in a bottom surface cover 16 instead of a support. The rest of the structure is similar to that of the electronic device according to the first embodiment. As shown in FIG. 6A, the elastic protruding portions 26a are formed towards a base portion 21 from an exterior surface of the bottom surface cover 16 at positions facing the base portion 21. With the electronic device according to this embodiment, when the electronic device is mounted, the elastic protruding portions 26a formed on the bottom surface cover 16 are compressed, a height position of a chassis with respect to a mounting surface 1 is lowered, and all supports attached to the chassis come into contact with the mounting surface 1. Thus, it is possible to prevent the chassis from wobbling.

Figure 6B:
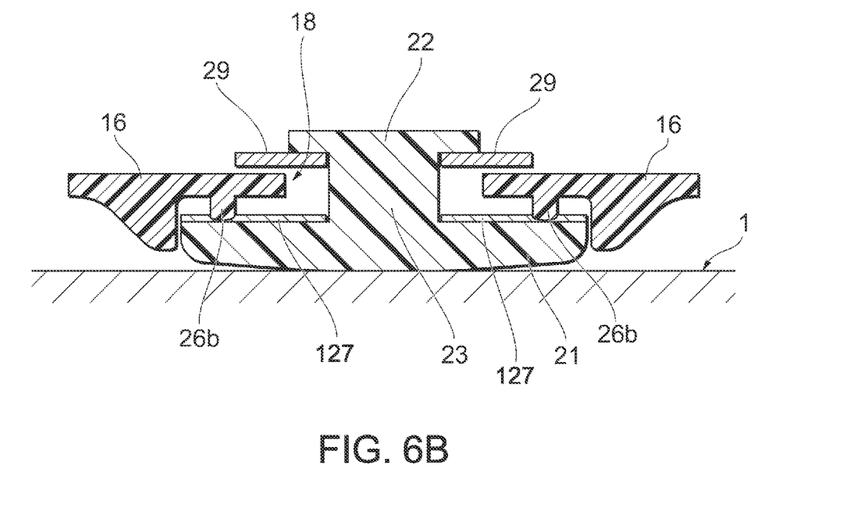
FIG. 6B is a sectional view in a case where the protruding portions are made from the same material as that of the bottom surface cover.

The protruding portions formed on the bottom surface cover 16 do not need to be made from an elastic material. For example, as shown in FIG. 6B, the protruding portions may also be formed integrally with the bottom surface cover 16 by using the same material as that of the bottom surface cover 16. At that time, a plate-shaped elastic body 127 is disposed at a position with which distal ends of the protruding portions 26b come into contact. By providing the elastic body 127, the protruding portions 26b compress the elastic body 127 when an electronic device is mounted, a height position of a chassis with respect to a mounting surface 1 is lowered, and all supports attached to the chassis come into contact with the mounting surface 1. Thus, it is possible to prevent the chassis from wobbling.

Third Embodiment

Figure 7A:
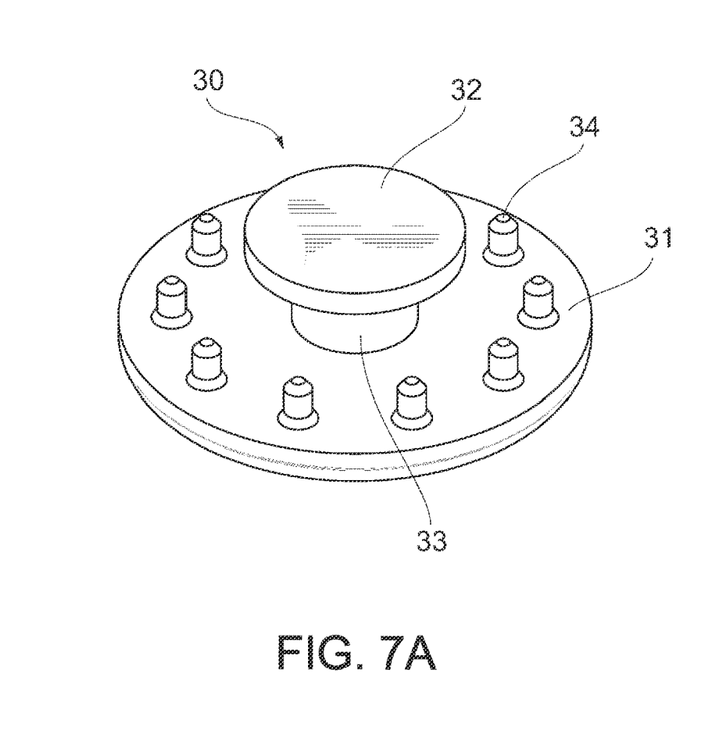
FIG. 7A is a perspective view of a support according to a third embodiment of the present invention.

FIG. 7A is a perspective view of a support 30 according to a third embodiment of the present invention. The support 30 according to the third embodiment is different from the support 20 according to the first embodiment in that elastic protruding portions 34 are formed integrally with a base portion 31. The rest of the structure is the same as the structure of the support 20 according to the first embodiment. Similarly to the support 20 according to the first embodiment, the support 30 according to this embodiment may be attached to an opening 18 of a chassis 17.

Unlike the support 20 according to the first embodiment, the support 30 according to this embodiment does not have the main body 25, and the elastic protruding portions 34 are formed integrally with the base portion 31. Therefore, the base portion 31 and the elastic protruding portions 34 can be treated as a single part, and part management can thus be done easily. Further, by forming the base portion 31 and the elastic protruding portions 34 integrally by pouring heated resin or the like into a single mold, it is not necessary to prepare molds for the base portion 31 and the elastic protruding portions 34, respectively, and it is possible to reduce manufacturing cost for the support 30. Further, a retaining portion 32 and a connecting portion 33 may also be formed integrally with the base portion 31. Thus, part management is done even more easily. Furthermore, manufacturing cost for the support 30 is reduced.

The elastic protruding portions 34 and the base portion 31 may be made from an elastic material that is different from an elastic material used for the retaining portion 32 and the connecting portion 33. In the support 30 according to this embodiment, the elastic protruding portions 34 and the base portion 31 are made from a material that is different from a material for the retaining portion 32 and the connecting portion 33. Therefore, the elastic protruding portions 34 and the base portion 31, and the retaining portion 32 and the connecting portion 33, respectively, are readily provided individual characteristics expected from a design perspective. For example, a soft elastic material is used to form the elastic protruding portions 34 so that elasticity of the elastic protruding portions 34 is improved, while a hard elastic material is used to form the retaining portion 32 so that the support 30 is prevented from coming off from the opening 18 of the chassis 17 due to deformation of the retaining portion 32.

Fourth Embodiment

Figure 7B:
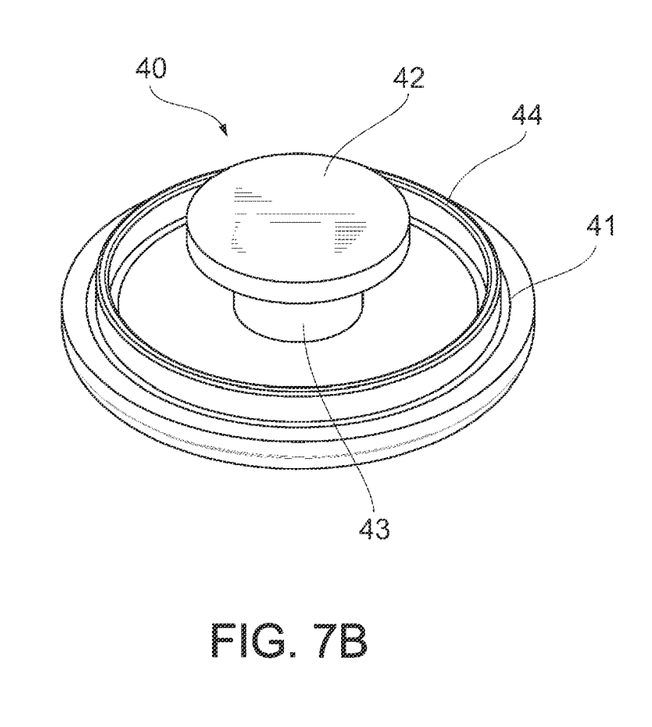
FIG. 7B is a perspective view of a support according to a fourth embodiment of the present invention.

FIG. 7B is a perspective view of a support 40 according to a fourth embodiment of the present invention. The support 40 according to the fourth embodiment is different from the support 20 according to the first embodiment in that an elastic protruding portion 44 is formed into an annular shape. The rest of the structure of the support 40 according to the fourth embodiment is similar to that of the support 20 according to the first embodiment. Similarly to the support 20 according to the first embodiment, the support 40 according to this embodiment may also be attached to an opening 18 of a chassis 17.

The elastic protruding portion 44 is formed into the annular shape like a wall that has its root on a base portion 41 side and surrounds a connecting portion 43. The elastic protruding portion 44 may be formed with a width that is reduced upwardly or uniform. Further, the support 40 may be attached to the chassis 17 so that a central part of a circle that defines the annular shape coincides with a central part of the opening 18. In the support 40 according to the embodiment, in whichever direction an exterior surface of the chassis 17 is inclined due to distortion of the chassis 17, at least a part of the elastic protruding portion 44 formed into the annular shape comes into contact with the exterior surface of the chassis 17 and is compressed. Thus, the support 40 follows inclination in any direction, and is thus able to support the chassis 17.

The embodiments described so far are provided in order to facilitate understanding of the present invention, and do not limit interpretation of the present invention. Constituents provided in the embodiments, as well as disposition, materials, conditions, shapes, sizes, and so on of those constituents are not limited to those described above as examples, and can be changed as appropriate. Further, the structures described in different embodiments may be partially replaced or combined with each other.

The invention claimed is:

1. A support attachable to an opening of a chassis of an electronic device, the support comprising:
    a base portion positionable on a side of an exterior surface of the chassis so that the base portion overlaps the opening;
    a retaining portion positionable on a side of an inner surface of the chassis whereby the opening is able to retain the retaining portion with or without interposing a separate member;
    a connecting portion that connects the base portion to the retaining portion and is insertable through the opening; and
    a plurality of elastic protruding portions on the base portion, wherein,
    the base portion can support the chassis through the elastic protruding portions, and
    the plurality of elastic protruding portions are positioned in an almost circle shape.

2. The support according to claim 1, wherein a central part of a circle defined by the plurality of elastic protruding portions coincides with a central part of the opening.

3. The support according to claim 1, comprising:
    an elastic member on which the plurality of elastic protruding portions are formed on a plate-shaped main body, wherein:
    the elastic member can be disposed between the base portion and the exterior surface of the chassis.

4. The support according to claim 3, wherein the elastic protruding portions can be in contact with the exterior surface of the chassis.

5. The support according to claim 3, further comprising:
    a fitting opening is in the main body of the elastic member, and into which the connecting portion is able to fit, and a slit that connects the fitting opening to a circumference of the main body.

6. The support according to claim 1, wherein the elastic protruding portions are formed integrally with the base portion.

7. The support according to claim 6, wherein the retaining portion and the connecting portion are formed integrally with the base portion.

8. The support according to claim 7, wherein the elastic protruding portions and the base portion are made from an elastic material that is different from an elastic material used for the retaining portion and the connecting portion.

9. The support according to claim 1, wherein the elastic protruding portions are formed into an annular shape.

10. The support according to claim 9, wherein a central part of a circle that defines the annular shape coincides with a central part of the opening.

11. The support according to claim 1, wherein:
the base portion is formed into a flange shape in a first end portion of the connecting portion, and
the retaining portion is formed into a flange shape in a second end portion that is on an opposite side of the connecting portion from the first end portion.

12. The support according to claim 11, wherein:
the retaining portion is formed so as to have a size that allows the retaining portion to be inserted through the opening, and
the separate member is disposable between the retaining portion and the inner surface of the chassis.

13. A support attachable to an opening of a chassis of an electronic device, the support comprising:
a base portion positionable on a side of an exterior surface of the chassis so that the base portion overlaps the opening;
a retaining portion positionable on a side of an inner surface of the chassis whereby the opening is able to retain the retaining portion with or without interposing a separate member;
a connecting portion that connects the base portion to the retaining portion and is insertable through the opening; and
an elastic protruding portion on the base portion, wherein,
the base portion can support the chassis through the elastic protruding portion,
the base portion, the retaining portion, and the connecting portion are an integrally-formed rubber leg.

14. An electronic device comprising:
a chassis having an opening and into which a support is attached, and an elastic protruding portion in an exterior surface of the chassis and facing the support; and
the support includes a base portion on a side of an exterior surface of the chassis so as to overlap the opening, a retaining portion on a side of an inner surface of the chassis so that the opening is able to retain the retaining portion with or without interposing a separate member, and a connecting portion that connects the base portion to the retaining portion and is inserted through the opening.

* * * * *